United States Patent
Tanino

(10) Patent No.: US 8,447,518 B2
(45) Date of Patent: May 21, 2013

(54) CURRENT POSITION DETECTOR FOR VEHICLE

(75) Inventor: Hideki Tanino, Kariya (JP)

(73) Assignee: DENSO CORPORATION, Kariya (JP)

( * ) Notice: Subject to any disclaimer, the term of this patent is extended or adjusted under 35 U.S.C. 154(b) by 203 days.

(21) Appl. No.: 13/110,187

(22) Filed: May 18, 2011

(65) Prior Publication Data

US 2011/0288772 A1 Nov. 24, 2011

(30) Foreign Application Priority Data

May 19, 2010 (JP) .................................. 2010-115465
Aug. 5, 2010 (JP) .................................. 2010-176104

(51) Int. Cl.
*G01C 21/00* (2006.01)
*G01C 21/06* (2006.01)

(52) U.S. Cl.
USPC ........... 701/472; 701/469; 701/480; 701/518; 701/534; 701/536; 701/495; 701/505; 702/151

(58) Field of Classification Search
USPC .... 701/472, 469, 480, 518, 534, 536; 702/151
See application file for complete search history.

(56) References Cited

U.S. PATENT DOCUMENTS

| 5,390,125 | A | * | 2/1995 | Sennott et al. ................ 701/472 |
| 5,404,307 | A | * | 4/1995 | Odagawa ...................... 701/501 |
| 5,424,953 | A | * | 6/1995 | Masumoto et al. ........... 701/530 |
| 5,469,158 | A | * | 11/1995 | Morita ........................... 340/988 |
| 5,479,079 | A | * | 12/1995 | Jeong et al. ............. 318/568.12 |
| 5,699,256 | A | * | 12/1997 | Shibuya et al. ............... 701/509 |
| 5,757,317 | A | * | 5/1998 | Buchler et al. ........... 342/357.31 |
| 5,991,525 | A | * | 11/1999 | Shah et al. ........................ 703/2 |
| 6,024,655 | A | * | 2/2000 | Coffee ........................... 473/407 |
| 6,081,230 | A | * | 6/2000 | Hoshino et al. .......... 342/357.32 |
| 6,253,154 | B1 | | 6/2001 | Oshizawa et al. |
| 6,317,688 | B1 | * | 11/2001 | Bruckner et al. ............. 701/472 |
| 6,615,135 | B2 | * | 9/2003 | Davies ........................... 701/480 |
| 6,658,353 | B2 | * | 12/2003 | Shimizu et al. ............... 701/410 |
| 6,731,237 | B2 | * | 5/2004 | Gustafson et al. ........ 342/357.59 |
| 6,826,478 | B2 | * | 11/2004 | Riewe et al. .................. 701/470 |

(Continued)

FOREIGN PATENT DOCUMENTS

| JP | A-06-341847 | 12/1994 |
| JP | A-07-301541 | 11/1995 |
| JP | A-2000-55678 | 2/2000 |

OTHER PUBLICATIONS

T. Shingai et al, "On Gyro-Gain Estimation in Dead Reckoning Navigation System Using Kalman Filter," *22nd Signal Processing Symposium* (Nov. 7, 2007).

*Primary Examiner* — Thomas Tarcza
*Assistant Examiner* — Tyler J Lee
(74) *Attorney, Agent, or Firm* — Posz Law Group, PLC

(57) ABSTRACT

A current position detector for a vehicle includes: an angular speed sensor; a speed sensor; a GPS receiver; a traveling trajectory estimating element for estimating a relative trajectory based on an orientation change amount and a traveling distance, and for estimating a traveling trajectory based on the relative trajectory and a GPS signal; and an error estimating element for estimating and correcting each error of an angular speed signal, a speed signal and the GPS signal. The error estimating element estimates a gain error of the angular speed signal such that an attachment angle gain error attributed to an attachment angle of the angular speed sensor and an angular speed gain error attributed to a non-linear gain property of the angular speed sensor are independently estimated.

7 Claims, 9 Drawing Sheets

U.S. PATENT DOCUMENTS

| | | | |
|---|---|---|---|
| 6,895,313 B2 * | 5/2005 | Imada et al. | 701/1 |
| 7,418,364 B1 * | 8/2008 | Horton et al. | 702/153 |
| 7,672,781 B2 * | 3/2010 | Churchill et al. | 701/468 |
| 2004/0181335 A1 * | 9/2004 | Kim et al. | 701/207 |
| 2009/0099774 A1 * | 4/2009 | Takac et al. | 701/216 |
| 2009/0119016 A1 | 5/2009 | Tanino et al. | |

* cited by examiner

STATE ESTIMATION PROCESS | OBSERVATION PROCESS

ATTACHMENT ANGLE ERROR

ANGULAR SPEED ERROR

CURRENT POSITION DETECTOR FOR VEHICLE

CROSS REFERENCE TO RELATED APPLICATIONS

This application is based on Japanese Patent Applications No. 2010-115465 filed on May 19, 2010, and No. 2010-176104 filed on Aug. 5, 2010, the disclosures of which are incorporated herein by reference.

TECHNICAL FIELD

The present invention relates to a current position detector for a vehicle. The detector estimates traveling trajectory of the vehicle.

BACKGROUND

Conventionally, in a position detector for a vehicle such as a vehicle navigation device for detecting a current position of the vehicle, a combination of a GPS receiver for utilizing a signal from an artificial satellite such as a GPS satellite and an independent sensor such as a vehicle speed sensor for outputting a vehicle speed signal corresponding to a speed of the vehicle and a gyroscope for detecting a rotation angular speed of the vehicle provides to generate an estimation traveling trajectory. Then, the current position of the vehicle is specified on a map with verifying the estimation traveling trajectory and map data. Here, the verification of the estimation traveling trajectory with the map data is defined as a map matching process.

In general, in the position detector for the vehicle, a motion vector of the vehicle is generated from an angular speed of the vehicle detected by the gyroscope and a traveling distance detected by the speed sensor. However, since each of the gyroscope and the speed sensor has an error, it is difficult to estimate the traveling trajectory with high accuracy. Specifically, regarding error factors of each sensor, for example, the gyroscope has an offset error and a gain error, and a distance coefficient error is caused by change of a tire diameter.

To compensate the above errors, the error factor such as the offset error of the orientation change of the vehicle, the gain error of the orientation change, and the distance coefficient error of the speed sensor is defined as one state vector X so that the error factor is modeled with using a Kalman filter in the error estimation process. Then, each error is estimated sequentially based on an output signal of the GPS receiver. Based on the estimated error, the gain correction amount for utilizing the gain correction of the detection value of the gyroscope is modified. This technique is described in JP-A-2009-115545 corresponding to US 2009/0,119,016.

However, in a device described in JP-A-2009-115545, each error is successively estimated under a condition that only a gain error of an attachment angle provides the gain error. The gain error of the attachment angle has a linear relationship with respect to the angular speed. Based on the estimated error, the gain correction amount for utilizing the gain correction of the detection value of the gyroscope is modified. Accordingly, the traveling trajectory of the vehicle is not estimated with high accuracy.

SUMMARY

In view of the above-described problem, it is an object of the present disclosure to provide a current position detector for a vehicle, which estimates traveling trajectory of the vehicle. Even if a gyroscope having an output voltage property with a non-linear relationship with respect to an angular speed is used, the current position detector estimates the traveling trajectory of the vehicle with high accuracy.

According to an aspect of the present disclosure, a current position detector for a vehicle includes: an angular speed sensor for outputting an angular speed signal corresponding to a rotation angular speed of the vehicle; a speed sensor of outputting a speed signal corresponding to a traveling speed of the vehicle; a GPS receiver for receiving an electric wave from a GPS satellite and for outputting a GPS signal, which provides to specify an absolute position and an heading of the vehicle; a traveling trajectory estimating element for estimating a relative trajectory of the vehicle based on an orientation change amount and a traveling distance, and for estimating a traveling trajectory of the vehicle based on the relative trajectory of the vehicle and the GPS signal, wherein the orientation change amount is calculated from the angular speed signal, and the traveling distance is calculated from the speed signal; and an error estimating element for estimating each error of the angular speed signal, the speed signal and the GPS signal with using a difference between the relative trajectory, the traveling trajectory and the GPS signal as an observation value, and for correcting each error of the angular speed signal, the speed signal and the GPS signal based on estimated corresponding error. The error estimating element estimates a gain error of the angular speed signal in such a manner that an attachment angle gain error attributed to an attachment angle of the angular speed sensor to the vehicle and an angular speed gain error attributed to a non-linear gain property of the angular speed sensor with respect to the angular speed are independently estimated.

In the above detector, since the attachment angle gain error and the angular speed gain error are independently estimated, the device can estimates the traveling trajectory of the vehicle with high accuracy even when an output voltage property of the angular speed sensor with respect to the angular speed is non-linear.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

The present inventor has studied about an error factor of a gyroscope. The present inventor discovered the following features. An error factor of a gain error of an orientation change in the error factor of the gyroscope includes a gain error of an attachment angle caused in a condition that a detection axis of the gyroscope is tilted and an angular speed gain error caused in a condition that the gain is changed in accordance with the angular speed. Although the gain error of the attachment angle has a linear relationship with respect to the angular speed, the angular speed gain error has a non-linear relationship with respect to the angular speed.

Figure 10:
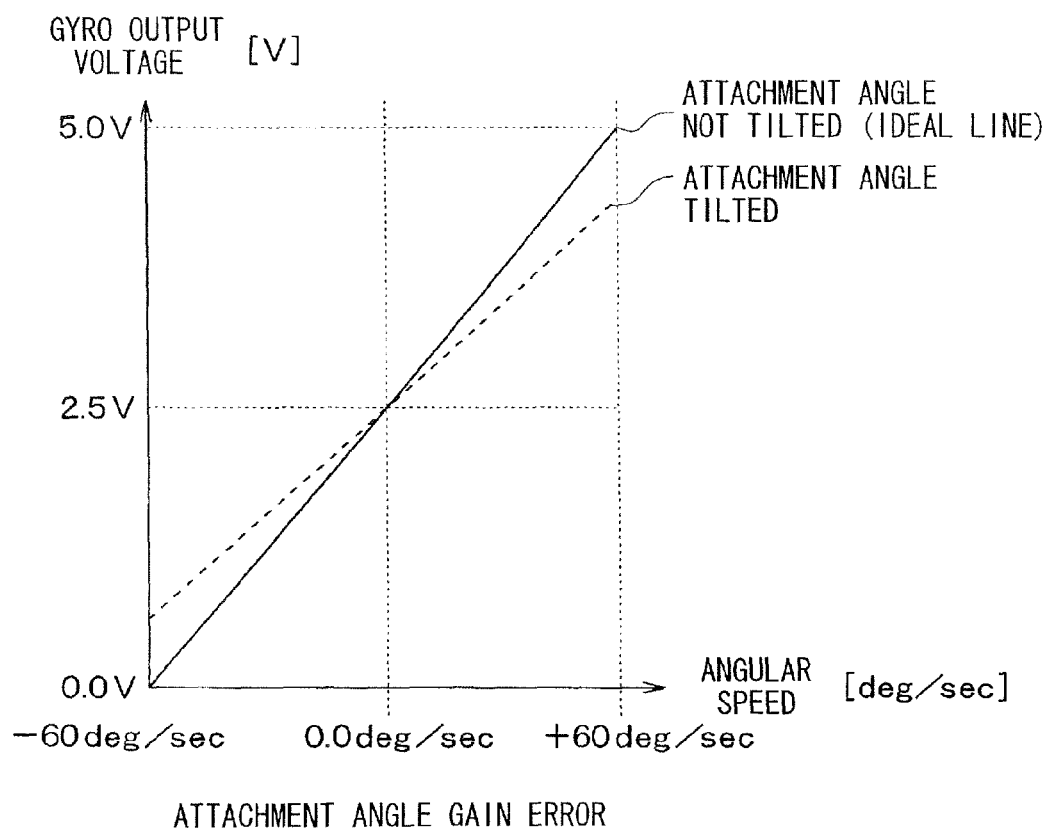
FIG. 10 is a graph showing a gain error of an attachment angle of the gyroscope.

FIG. 10 shows the gain error of the attachment angle of the gyroscope. In FIG. 10, an output voltage property with respect to the angular speed of the gyroscope as an ideal property under a condition that the gyroscope is arranged without tilting a detection axis of the gyroscope is shown as a solid line. An output voltage property with respect to the angular speed of the gyroscope as an actual property under a condition that the gyroscope is arranged with tilting the detection axis of the gyroscope is shown as a dot line. These output voltage properties have predetermined slopes with respect to the angular speed (i.e., X-axis). The gain error of the attachment angle is changed with respect to the angular speed with a predetermined ratio. Specifically, the gain error of the attachment angle has a linear relationship with respect to the angular speed. Here, after the gyroscope is attached to the vehicle, the attachment angle and the gain error of the attachment angle are not changed.

Figure 11:
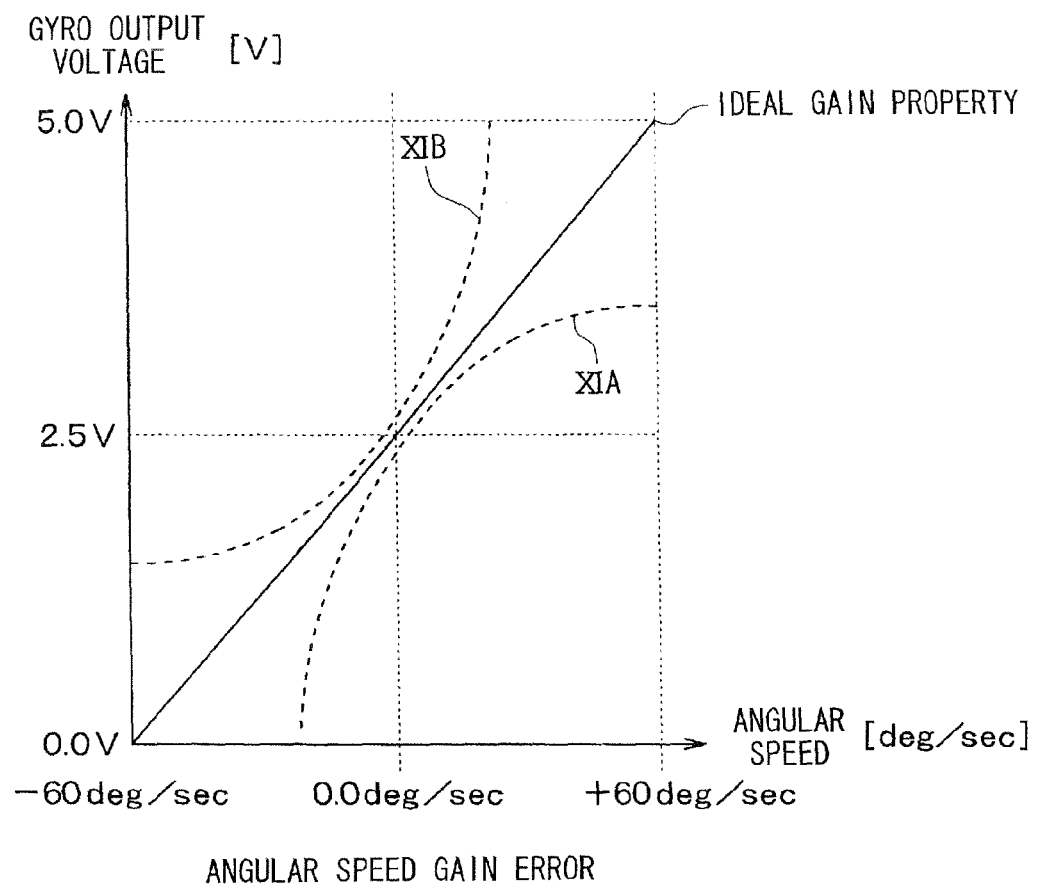
FIG. 11 is a graph showing an angular speed gain error of the gyroscope.

FIG. 11 shows the angular speed gain error of the gyroscope. In FIG. 11, the output voltage property of the gyroscope as an ideal gain property is shown as a solid line. An actual output voltage property of the gyroscope is shown as a dot line. The actual output voltage property of the gyroscope may be a non-linear curve shown as XIA in FIG. 11. Alternatively, the actual output voltage property may be a non-linear curve shown as XIB in FIG. 11. Thus, the actual gain property of the gyroscope and the actual angular speed gain error are different in each individual device. Further, when the gyroscope is not excellent, the output voltage property with respect to the angular speed may be non-linear. The angular speed gain error is a difference between the actual output voltage of the gyroscope and the ideal output voltage of the gyroscope.

Figure 12:
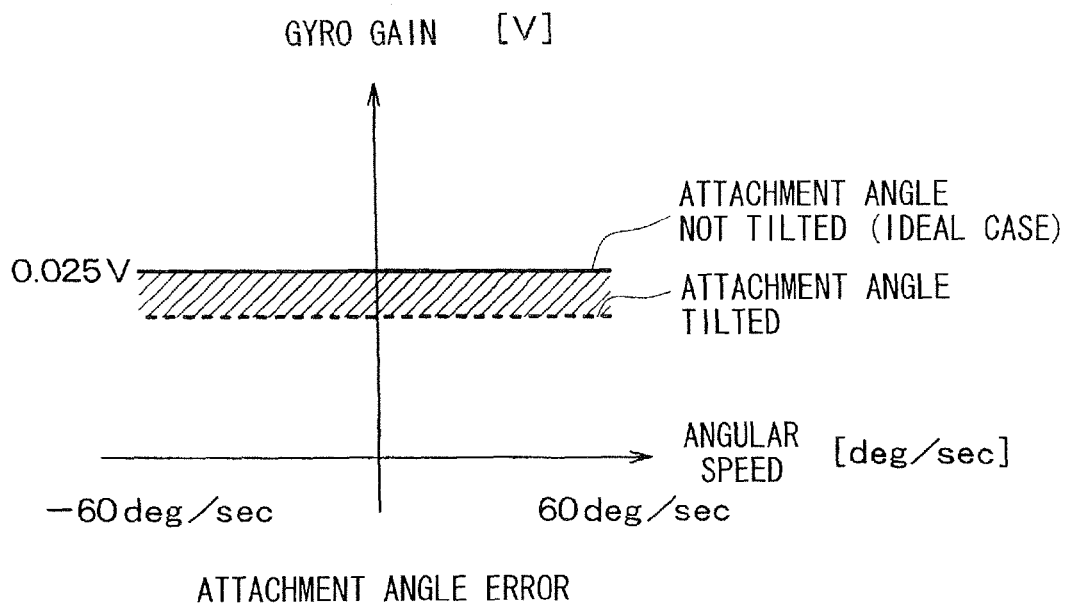
FIG. 12 is a graph showing a gain property with respect to the angular speed of the gyroscope.

Here, a total voltage of the output voltage shown in FIG. 11 and the output voltage shown in FIG. 12 is output from, the gyroscope.

FIG. 12 shows an example of the gain property with respect to the angular speed of the gyroscope. In FIG. 12, the gain property of the gyroscope under a condition that the detection axis of the gyroscope is not titled is shown as a solid line. The gain property of the gyroscope under a condition that the detection axis of the gyroscope is tilted is shown as a dot line. The gain property of the gyroscope under a condition that the detection axis of the gyroscope is not titled is constant to be 0.025 volts with respect to the angular speed. The gain property of the gyroscope under a condition that the detection axis of the gyroscope is titled is also constant to be smaller than 0.025 volts with respect to the angular speed.

Figure 13:
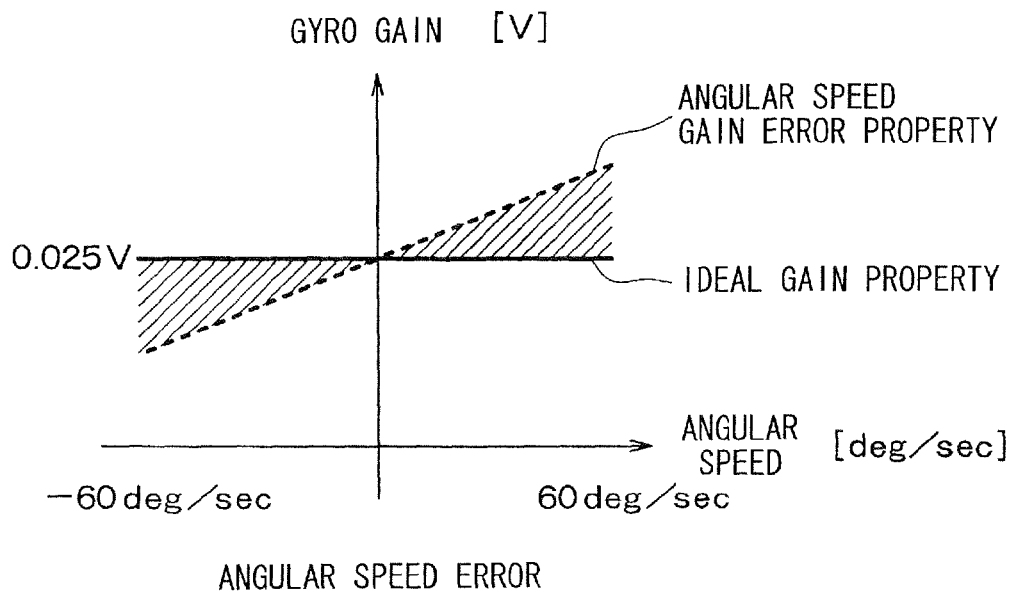
FIG. 13 is a graph showing a gain property with respect to the angular speed of the gyroscope.

FIG. 13 shows an example of the gain property of the gyroscope with respect to the angular speed. In FIG. 13, the ideal gain property of the gyroscope is shown as a solid line. The actual gain property of the gyroscope is shown as a dot line. The ideal gain property of the gyroscope is constant to be 0.025 volts with respect to the angular speed. However, the actual gain property of the gyroscope is not constant but has a slope with respect to the angular speed.

As shown in FIGS. 12 and 13, the gain property of the gyroscope regarding the gain error of the attachment angle is constant with respect to the angular speed. However, the gain property of the gyroscope regarding the angular speed gain error is changed with respect to the angular speed.

Accordingly, the device described in JP-A-2009-115545 does not consider the angular speed gain error having the non-linear relationship with respect to the angular speed, but estimates each error with considering only the gain error of the attachment angle having the linear relationship with respect to the angular speed as the gain error. Further, based on the estimated each error, the device modifies the gain correction amount for utilizing the gain correction of the detection value of the gyroscope. Accordingly, when the gyroscope having the output voltage property with the non-linear relationship with respect to the angular speed is used, the traveling trajectory of the vehicle is not estimated with high accuracy.

In view of the above problem, even when the gyroscope having the output voltage property with the non-linear relationship with respect to the angular speed is used, it is required to estimate the traveling trajectory of the vehicle with high accuracy.

Figure 1:
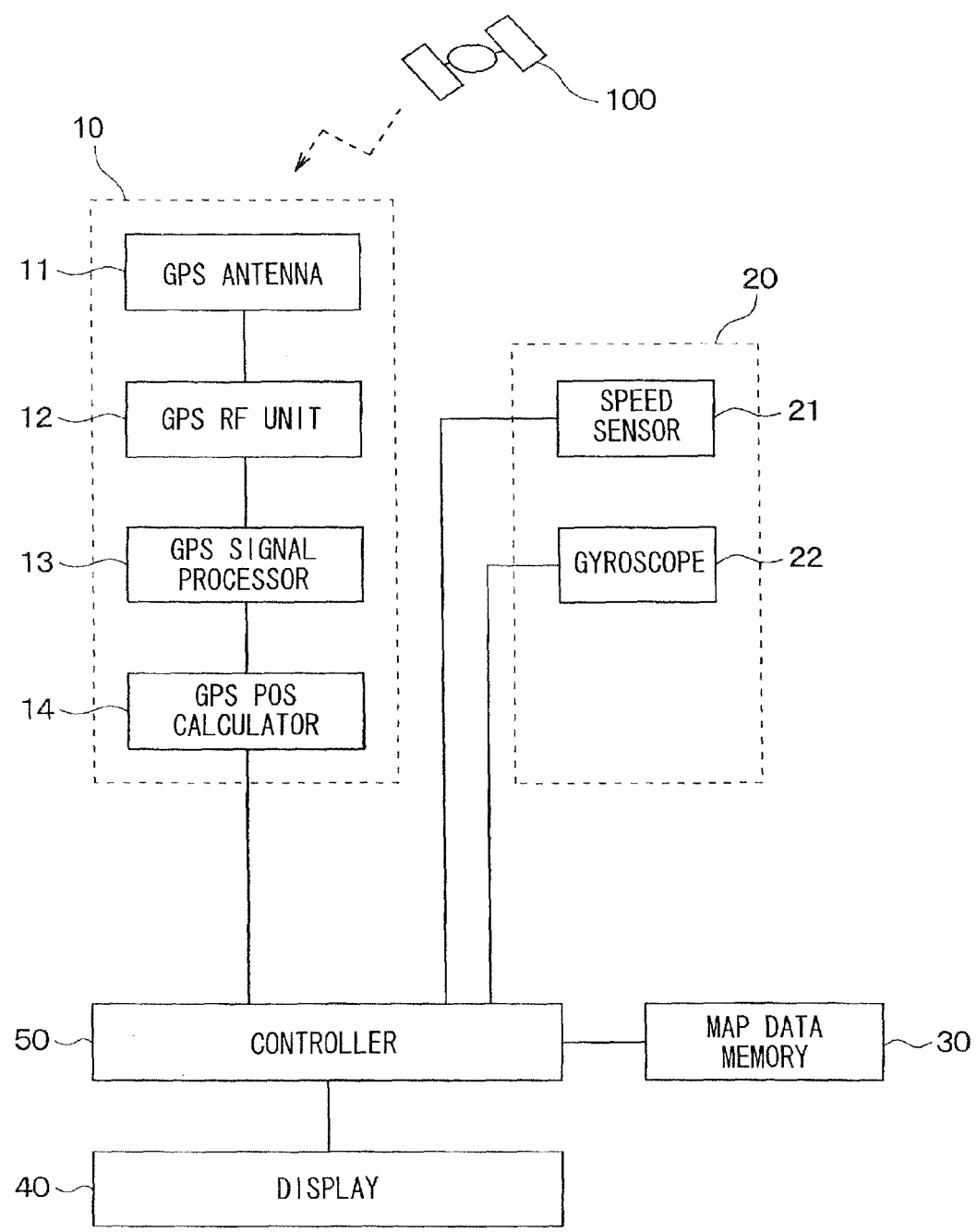
FIG. 1 is a current position detector for a vehicle according to an example embodiment.

A current position detector for a vehicle according to an example embodiment is shown in FIG. 1. The detector is a part of a navigation device for the vehicle. The detector includes a GPS receiver 10, an independent sensor 20, a map data memory 30, a display 40 and a controller 50.

The GPS receiver 10 includes a GPS antenna 11, a GPS-RF unit 12, a GPS signal processor 13, and a GPS position calculator 14. The GPS antenna 11 receives electric waves from multiple GPS satellites 100. The GPS-RF unit 12 converts a high frequency signal input from the GPS antenna 11 to a reception signal in an intermediate frequency band. The GPS signal processor 13 executes a signal processing such as capturing and synchronizing the reception signal input from the GPS-RF unit 12 and holding and synchronizing the reception signal. The GPS position calculator 14 executes GPS position calculation based on data output from the GPS signal processor 13. Further, the GPS position calculator 14 outputs position data obtained by the GPS position calculation.

The GPS receiver 10 receives an electric wave from the GPS satellite 100 so that the receiver 10 calculates a GPS position showing an absolute current position of the vehicle and a speed vector for specifying a traveling direction of the vehicle. Then, the receiver 10 outputs calculation result as position data.

The independent sensor 20 includes a vehicle speed sensor 21 functioning as a speed sensor and a gyroscope 22 functioning as an angular speed sensor. The vehicle speed sensor 21 outputs a vehicle speed pulse signal corresponding to the traveling speed of the vehicle. The gyroscope 22 outputs an angular speed signal corresponding to a rotation angular speed of the vehicle.

The map data memory 30 reads out map data from a map data memory medium, which stores the map data. The map data includes road data, map matching data, landscape data, a facility data and the like.

The road data shows a length of each link, a type of a road, the number of lanes in the road, traffic regulations such as one-way traffic regulation, and a position of a traffic signal. The map matching data provides to improve position detection accuracy. The landscape data shows a position, a shape and the name of a river, a lake, a sea, a railroad, a facility or the like. The facility data shows the name, an address and a type of the facility. Here, the map data memory medium is a CD-ROM, a DVD-ROM, a hard disk drive, a memory card or the like.

The display 40 includes a display element such as a liquid crystal display panel, and displays an image corresponding to an image signal input from a computer on the display panel.

The controller 50 is a computer having a CPU, a ROM, a RAM, a non-volatile memory, a I/O element and the like. The CPU executes various processes according to programs stored in the ROM.

The controller 50 executes a traveling trajectory estimation process, an error estimation process, a map matching process and the like. In the traveling trajectory estimation process, the controller 50 estimates relative trajectory of the vehicle based on an orientation change amount and a distance factor. The orientation change amount is calculated according to an output value of the gyroscope 22. The distance factor is calculated according to an output value of the speed sensor 21. Further, in the traveling trajectory estimation process, the controller 50 estimates a traveling trajectory of the vehicle based on the relative trajectory and an output from the GPS receiver 10. In the error estimation process, the controller 50 estimates an offset error of the orientation change amount, a gain error of the orientation change amount and an heading error according to the output value of the gyroscope 22 and the output value of the GPS receiver 10. In the map matching process, the controller 50 matches the traveling trajectory of the vehicle to the road data of map information stored in the map memory 70, so that the controller 50 corrects the position of the vehicle to be a position on the road, the position of the vehicle being an estimation position corrected by the GPS position. Here, in the traveling trajectory estimation process, the offset of the orientation change amount, the gain of the orientation change amount and the heading, which are used for the estimation of the traveling trajectory of the vehicle in the traveling trajectory estimation process, are corrected according to each error estimated in the error estimation process.

The controller 50 defines each error factor of an estimation navigation method as one state vector x so that the error factor is modeled with using a Kalman filter in the error estimation process. Thus, the controller 50 executes the error estimation process for obtaining an estimation value of each error.

Here, the Kalman filter will be explained as follows. In the Kalman filter, the error signal to be estimated is defined as the state vector x. The state vector x is updated according to the following state equation F1.

$$x(t+1, t) = A(t+1, t)x(t) + v(t) \quad\quad \text{F1}$$

Here, x(t) represents the state vector as an error of the estimation navigation method. A(t+1, t) represents a state transition matrix. v(t) represents a noise generated in a process for generating the state vector.

Further, the observation process is shown as follows.

$$y(t) = C(t)x(t) + w(t) \quad\quad \text{F2}$$

Here, y(t) represents an observation signal. C(t) represents an observation matrix. w(t) represents a noise generated in the observation process.

Figure 2:
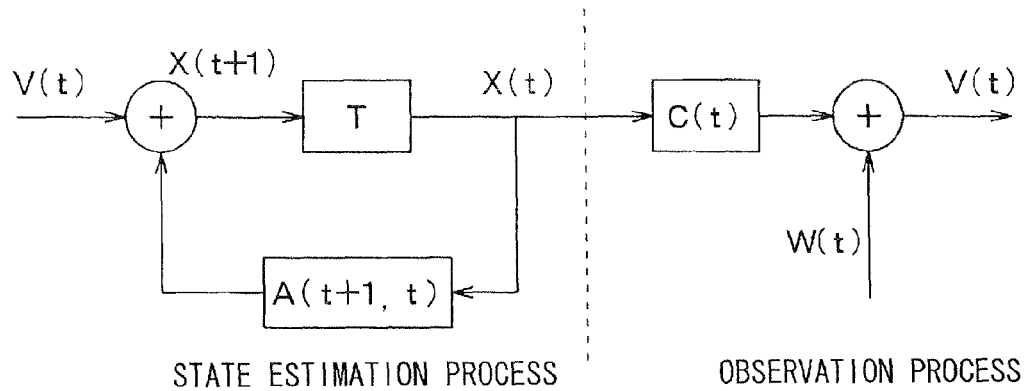
FIG. 2 is a flow chart showing a signal flow of a Kalman filter.

The relationship between the formula F1 and the equation F2 is shown in FIG. 2 with using a signal flow chart.

In the Kalman filter, the state vector is estimated by a least square estimation method with using the observation signal in a cycle calculation.

$$P(t|t-1) = A(t|t-1)P(t-1|t-1)A^T(t|t-1) + V(t) \quad\quad \text{F3}$$

$$G(t) = P(t|t-1)C^T\{CP(t|t-1)C^T + W(t)\}^{-1} \quad\quad \text{F4}$$

$$\hat{x}(t|y_{t-1}) = A(t|t-1)\hat{x}(t-1|y_{t-1}) \quad\quad \text{F5}$$

$$\hat{x}(t|y_t) = \hat{x}(t|y_{t-1}) + G(t)\{y(t) - C\hat{x}(t|y_{t-1})\} \quad\quad \text{F6}$$

$$P(t|t) = P(t|t-1) - G(t)CP(t|t-1) \quad\quad \text{F7}$$

Here, G(t) represents a Kalman gain, P(t|t−1) represents an error covariance predicted value of the state vector x, P(t|t) represents an error covariance, V(t) represents a covariance matrix of the noise v(t), and W(t) represents an error covariance matrix of the noise w(t).

In the Kalman filter, the error of the estimation navigation method is defined as the state vector, which is estimated from the observation signal. The estimation value of the error is fed back to the estimation navigation method so that the estimation value is corrected. Thus, it can be assumed that the preliminary estimation value x(t|y_{t-1}) is zero. Accordingly, the equation F6 is modified to the following equation F8.

$$\hat{x}(t|y_t) = G(t)y(t) \quad\quad \text{F8}$$

Next, the modeling step of the estimation navigation method and the formulation of the Kalman filter will be explained. In the present embodiment, after each error of attachment of the gyroscope is estimated with using the Kalman filter A for estimating each error under a condition that only the gain error of the attachment angle of the gyro scope 22 is defined as the gain error, the angular speed gain error of the gyroscope is estimated with using the Kalman filter B for estimating each error under a condition that the gain error of the attachment angle of the gyroscope 22 is distinguished from the angular speed gain error.

First, the Kalman filter A will be explained. The Kalman filter A defines six errors as the state vector x so that the errors are modeled. The six errors are an offset error defined by $\epsilon G$, a gain error defined by $\epsilon S$, an heading error $\epsilon \theta$, a distance factor error $\epsilon K$, an absolute position north orientation error $\epsilon Y$, and an absolute position east orientation error $\epsilon X$. Thus, the estimation value of each error is obtained.

Here, $\theta T$ represents a true heading, D represents the orientation change amount of a previous time, L represents a traveling distance from the previous time, T represents an elapsed time from the previous time. Further, $\theta$ represents an heading obtained from the orientation change amount, and therefore, the heading $\theta$ is equal to a sum of the true heading $\theta T$ and the sensor error.

$$\epsilon G_t = \epsilon G_{t-1} + \epsilon_0 \quad\quad \text{F9}$$

$$\epsilon S_t = \epsilon S_{t-1} + \epsilon_1 \quad\quad \text{F10}$$

$$\epsilon \theta_t = T \cdot \epsilon G_{t-1} + D \cdot \epsilon S_{t-1} + \epsilon \theta_{t-1} + \epsilon_2 \quad\quad \text{F11}$$

$$\epsilon K_t = \epsilon K_{t-1} + \epsilon_3 \quad\quad \text{F12}$$

$$\epsilon Y_t = \sin(\theta) \cdot L \cdot (1 - \epsilon K_{t-1}) - \sin(\theta_T) \cdot L + \epsilon Y_{t-1} \quad\quad \text{F13}$$

$$\epsilon X_t = \cos(\theta) \cdot L \cdot (1 - \epsilon K_{t-1}) - \cos(\theta_T) \cdot L + \epsilon X_{t-1} \quad\quad \text{F14}$$

$$\theta = \theta^T + \epsilon \theta_{t-1} + T \cdot \epsilon G_{t-1}/2 + D \cdot \epsilon S_{t-1/2}$$

The equations F9 to F14 are differentiated partially, and the state vector generating process will be shown as follows.

$$\begin{bmatrix} \varepsilon G_{t+1} \\ \varepsilon S_{t+1} \\ \varepsilon \theta_{t+1} \\ \varepsilon K_{t+1} \\ \varepsilon Y_{t+1} \\ \varepsilon X_{t+1} \end{bmatrix} = \begin{bmatrix} 1 & 0 & 0 & 0 & 0 & 0 \\ 0 & 1 & 0 & 0 & 0 & 0 \\ T & D & 1 & 0 & 0 & 0 \\ 0 & 0 & 0 & 1 & 0 & 0 \\ \cos(\theta) \cdot T \cdot L/2 & \cos(\theta) \cdot D \cdot L & \cos(\theta) \cdot L & \sin(\theta) \cdot L & 1 & 0 \\ -\sin(\theta) \cdot T \cdot L/2 & -\sin(\theta) \cdot D \cdot L & -\sin(\theta) \cdot L & \cos(\theta) \cdot L & 0 & 1 \end{bmatrix} \cdot \begin{bmatrix} \varepsilon G_1 \\ \varepsilon Sa_1 \\ \varepsilon \theta_1 \\ \varepsilon K_1 \\ \varepsilon Y_1 \\ \varepsilon X_1 \end{bmatrix} + \begin{bmatrix} \varepsilon_0 \\ \varepsilon_1 \\ \varepsilon_2 \\ \varepsilon_3 \\ 0 \\ 0 \end{bmatrix} \quad \text{F15}$$

Here, $\varepsilon_0$ represents an offset noise (i.e., a shift of the offset caused by temperature drift or the like), $\varepsilon_1$ represents a gain noise (i.e., a shift of the gyro gain caused by temperature drift or the like), $\varepsilon_2$ represents an heading noise (i.e., a shift caused by cross coupling of the gyroscope or the like), and $\varepsilon_{13}$ represents a distance measurement noise (i.e., a shift caused by variation of the speed sensor with time).

Next, the modeling of the observation process will be explained. The observation value is calculated by a difference between the output value of the estimation navigation method and the output value of the GPS. Each output value includes an error, so that the observation value includes a sum of an error in the output value of the estimation navigation method and an error in the output value of the GPS.

The observation value y is related to the state vector amount x, so that the value y and the amount x are modeled as follows.

$$y(t) = C(t)x(t) + w(t) \quad \text{F16}$$

$$\begin{bmatrix} \varepsilon \theta_{DRt} - \varepsilon \theta_{GPSt} \\ \varepsilon K_{DRt} - \varepsilon K_{GPSt} \\ \varepsilon Y_{DRt} - \varepsilon Y_{GPSt} \\ \varepsilon X_{DRt} - \varepsilon X_{GPSt} \end{bmatrix} = \begin{bmatrix} 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} \cdot \begin{bmatrix} \varepsilon G_t \\ \varepsilon S_t \\ \varepsilon \theta_t \\ \varepsilon K_t \\ \varepsilon Y_t \\ \varepsilon X_t \end{bmatrix} + \begin{bmatrix} -\varepsilon \theta_{GPSt} \\ -\varepsilon K_{GPSt} \\ -\varepsilon Y_{GPSt} \\ -\varepsilon X_{GPSt} \end{bmatrix}$$

Here, an index DRt represents that a value is obtained by the estimation navigation method based on the signal from the gyroscope 22 and the speed sensor 21 at time t. An index GPSt represents that a value is output from the GPS at time t.

In the equation F16, a difference of $\varepsilon \theta_{DRt} - \varepsilon \theta_{GPSt}$ is a difference of the orientation output from the GPS receiver 10 and the heading obtained by the estimation navigation method. Specifically, the heading obtained by the estimation navigation method includes the true heading and the error $\varepsilon \theta_{DRt}$. The orientation ouput from the GPS receiver 10 includes the true heading and the error $\varepsilon \theta_{GPSt}$. Thus, the difference $\varepsilon \theta_{DRt} - \varepsilon \theta_{GPSt}$ between the heading obtained by the estimation navigation method and the orientation output from the GPS receiver 10 is calculated.

Similarly, in the equation F16, a difference of $\varepsilon K_{DRt} - \varepsilon K_{GPSt}$ is a distance factor error, which is obtained from a difference between the speed obtained by the estimation navigation method and a speed output from the GPS receiver 10. In the equation F16, a difference of $\varepsilon X_{DRt} - \varepsilon X_{GPSt}$ and a difference of $\varepsilon Y_{DRt} - \varepsilon Y_{GPSt}$ are an error of a X component and an error of a Y component between the absolute position obtained by the estimation navigation method and the absolute position output from the GPS receiver 10.

Next, the Kalman filter B will be explained. The Kalman filter B distinguishes the angular speed gain error $\varepsilon Sa$ from the gain error $\varepsilon Sb$ of the attachment angle. The gain error $\varepsilon S$ includes the angular speed gain error $\varepsilon Sa$ and the gain error $\varepsilon Sb$ of the attachment angle. Specifically, the offset error $\varepsilon G$, the angular speed gain error $\varepsilon Sa$, the gain error $\varepsilon Sb$ of the attachment angle, the heading error $\varepsilon \theta$, the distance factor error $\varepsilon K$, the absolute position north orientation error $\varepsilon Y$, and the absolute position east orientation error $\varepsilon X$ are defined as the state vector amount x so that the errors are modeled. Thus, the estimation value of each error is obtained. Here, the gain error $\varepsilon Sb$ of the attachment angle corresponds to the gain error $\varepsilon S$ in the Kalman filter A.

Here, $\theta T$ represents the true heading, D represents the orientation change amount of a previous time, L represents a traveling distance from the previous time, T represents an elapsed time from the previous time. Further, $\theta$ represents an heading obtained from the orientation change amount, and therefore, the heading $\theta$ is equal to a sum of the true heading $\theta T$ and the sensor error.

$$\varepsilon G_t = \varepsilon G_{t-1} + \varepsilon_0 \quad \text{F17}$$

$$\varepsilon Sa_t = \varepsilon Sa_{t-1} + \varepsilon_{11} \quad \text{F18-1}$$

$$\varepsilon Sb_t = \varepsilon Sb_{t-1} + \varepsilon_{12} \quad \text{F18-2}$$

$$\varepsilon \theta_t = T \cdot \varepsilon G_{t-1} + D^2 \cdot \varepsilon Sa_{t-1} + D \cdot \varepsilon Sb_{t-1} + \varepsilon \theta_{t-1} + \varepsilon_2 \quad \text{F19}$$

$$\varepsilon K_t = \varepsilon K_{t-1} + \varepsilon_3 \quad \text{F20}$$

$$\varepsilon Y_t = \sin(\theta) \cdot L \cdot (1 - \varepsilon K_{t-1}) - \sin(\theta_T) \cdot L + \varepsilon Y_{t-1} \quad \text{F21}$$

$$\varepsilon X_t = \cos(\theta) \cdot L \cdot (1 - \varepsilon K_{t-1}) - \cos(\theta_T) \cdot L + \varepsilon X_{t-1} \quad \text{F22}$$

$$\theta = \theta_T + \varepsilon \theta_{t-1} + T \cdot \varepsilon G_{t-1}/2 + D^2 \cdot \varepsilon S_{at-1}/2 + D \cdot \varepsilon S_{bt-1}/2$$

The equations F17 to F22 are differentiated partially, and the state vector generating process will be shown as follows.

Figure 3:
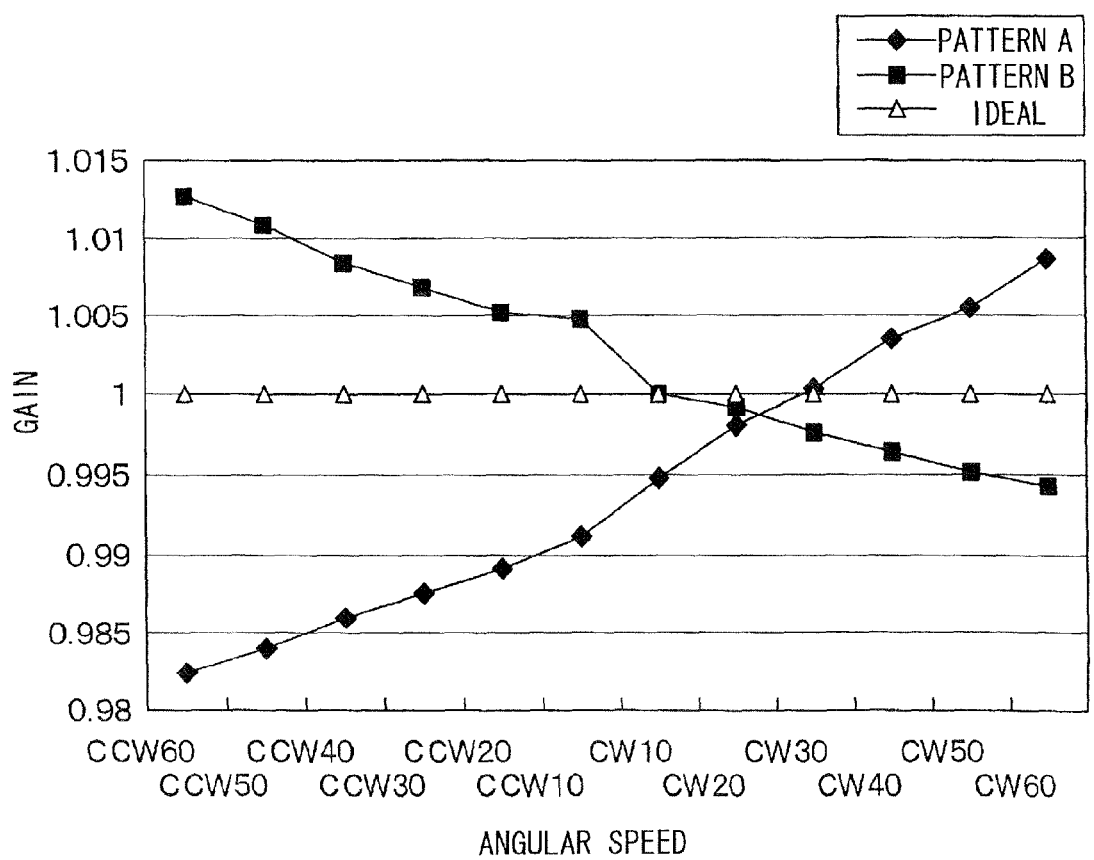
FIG. 3 is a graph showing a gain property with respect to an angular speed in an actual gyroscope.

FIG. 3 shows a gain property with respect to the angular speed in an actual gyroscope when the gain of an ideal gyroscope is defined as 1. A vertical axis represents a gain under a condition that the ideal gain is one. A horizontal axis represents an angular speed. CW in the horizontal axis represents a clockwise angular speed. CCW in the horizontal axis represents a counter-clockwise angular speed. CW60 represents +60 degrees per second, and CCW60 represents −60 degrees per second. The actual gyroscope may provide the gain property shown as pattern A, and alternatively, the actual gyroscope may provide the gain property shown as pattern B.

In the Kalman filter A, the gain error of the attachment angle is estimated with using the equation F10. Further, the heading error is estimated with using the equation F11. The second term $D \,\epsilon S_{t-1}$ of the equation F11 is a term relating to the gain error calculated under a condition that only the gain error of the attachment angle is an error factor. Specifically, in the Kalman filter A, the gain error provided by a linear function having an orientation change amount D as a variable affects the heading error.

However, when the Kalman filter A is used, and the gain is changed in accordance with the angular speed, it is not possible to estimate the heading error accurately, as shown in the pattern A or the pattern B in FIG. 3.

Thus, in the Kalman filter B, the angular speed gain error and the gain error of the attachment angle are distinguishably estimated with using the equations F18-1 and F18-2, respectively. Further, the heading error is estimated with using the equation F19. The second term $D^2 \,\epsilon Sa_{t-1}$ of the equation F19 is a term relating to the angular speed gain error. The third term $D \,\epsilon Sb_{t-1}$ of the equation F19 is a term relating to the gain error of the attachment angle. Specifically, in the Kalman filter B, the angular speed gain error provided by a quadratic function having the orientation change amount D as a variable and the gain error of the attachment angle provided by a linear function having an orientation change amount D as a variable affects the heading error.

The equations F17 to F22 are differentiated partially, and the state vector generating process will be shown as follows.

Here, $\epsilon_0$ represents an offset noise (i.e., a shift of the offset caused by temperature drift or the like), $\epsilon_{11}$ represents a first gain noise (i.e., a shift of the gyro gain caused by the attachment angle of the gyroscope), $\epsilon_{12}$ represents a second gain noise (i.e., a shift of the gyro gain caused by the angular speed of the gyroscope), $\epsilon_2$ represents an heading noise (i.e., a shift of the gyroscope), and $\epsilon_3$ represents a distance measurement noise (i.e., a shift caused by variation of a tire diameter with time).

$$\begin{bmatrix} \epsilon G_{t+1} \\ \epsilon Sa_{t+1} \\ \epsilon Sb_{t+1} \\ \epsilon \theta_{t+1} \\ \epsilon K_{t+1} \\ \epsilon Y_{t+1} \\ \epsilon X_{t+1} \end{bmatrix} = \begin{bmatrix} 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ T & D^2 & D & 1 & 0 & 0 & 0 \\ 0 & 0 & 0 & 0 & 1 & 0 & 0 \\ \cos(\theta) \cdot T \cdot L/2 & \cos(\theta) \cdot D^2 \cdot L/2 & \cos(\theta) \cdot D \cdot L/2 & \cos(\theta) \cdot L & \sin(\theta) \cdot L & 1 & 0 \\ -\sin(\theta) \cdot T \cdot L/2 & -\sin(\theta) \cdot D^2 \cdot L/2 & -\sin(\theta) \cdot D \cdot L/2 & -\sin(\theta) \cdot L & \cos(\theta) \cdot L & 0 & 1 \end{bmatrix} \cdot \quad \text{F23}$$

$$\begin{bmatrix} \epsilon G_1 \\ \epsilon Sa_1 \\ \epsilon Sb_1 \\ \epsilon \theta_1 \\ \epsilon K_1 \\ \epsilon Y_1 \\ \epsilon X_1 \end{bmatrix} + \begin{bmatrix} \epsilon_0 \\ \epsilon_{11} \\ \epsilon_{12} \\ \epsilon_3 \\ \epsilon_4 \\ 0 \\ 0 \end{bmatrix}$$

The observation value is calculated from a difference between the output value of the estimation navigation method and the output value of the GPS. Each output value includes an error, so that the observation value includes a sum of an error of the estimation navigation method and an error of the GPS.

Next, the observation value y is related to the state vector x, so that the value y and the amount x are modeled as follows.

$$y(t) = C(t)x(t) + w(t) \quad \text{F24}$$

$$\begin{bmatrix} \epsilon\theta_{DRt} - \epsilon\theta_{GPSt} \\ \epsilon K_{DRt} - \epsilon K_{GPSt} \\ \epsilon Y_{DRt} - \epsilon Y_{GPSt} \\ \epsilon X_{DRt} - \epsilon X_{GPSt} \end{bmatrix} = \begin{bmatrix} 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \end{bmatrix} \cdot \begin{bmatrix} \epsilon G_t \\ \epsilon Sa_t \\ \epsilon Sb_t \\ \epsilon \theta_t \\ \epsilon K_t \\ \epsilon Y_t \\ \epsilon X_t \end{bmatrix} +$$

$$\begin{bmatrix} -\epsilon\theta_{GPSt} \\ -\epsilon K_{GPSt} \\ -\epsilon Y_{GPSt} \\ -\epsilon X_{GPSt} \end{bmatrix}$$

Here, an index DRt represents that a value is obtained by the estimation navigation method based on the signal from the gyroscope 22 and the speed sensor 21 at time t. An index GPSt represents that a value is output from the GPS at time t.

In the equation F24, a difference of $\epsilon\theta_{DRt} - \epsilon\theta_{GPSt}$ is a difference of the orientation output from the GPS receiver 10 and the heading obtained by the estimation navigation method. Specifically, the heading obtained by the estimation navigation method includes the true heading and the error $\epsilon\theta_{DRt}$. The orientation output from the GPS receiver 10 includes the true heading and the error $\epsilon\theta_{GPSt}$. Thus, the difference $\epsilon\theta_{DRt} - \epsilon\theta_{GPSt}$ between the heading obtained by the estimation navigation method and the orientation output from the GPS receiver 10 is calculated.

Similarly, in the equation F24, a difference of $\epsilon K_{DRt} - \epsilon K_{GPSt}$ is a distance factor error, which is obtained from a difference between the speed obtained by the estimation navigation method and a speed output from the GPS receiver 10. In the equation F24, a difference of $\epsilon X_{DRt} - \epsilon X_{GPSt}$ and a difference of $\epsilon Y_{DRt} - \epsilon Y_{GPSt}$ are an error of a X component and an error of a Y component between the absolute position obtained by the estimation navigation method and the absolute position output from the GPS receiver 10.

When the calculation in the Kalman filter A is executed, the state vector x defined by six errors in the state vector generating process is obtained. The offset correction and the gain correction of the orientation change amount calculated from the output value of the gyroscope 22, the distance factor correction calculated from the output value of the speed sensor 21, and the absolute position correction are performed.

Further, after the calculation in the Kalman filter A is executed, the calculation in the Kalman filter B is executed. Thus, the state vector x defined by seven errors, which is determined in the state vector generating process, is obtained. The offset correction of the orientation change amount, the gain correction of the orientation change amount and the angular speed gain correction calculated from the output value of the gyroscope 22, the distance factor correction calculated from the output value of the speed sensor 21, and the absolute position correction are performed.

Figure 4:
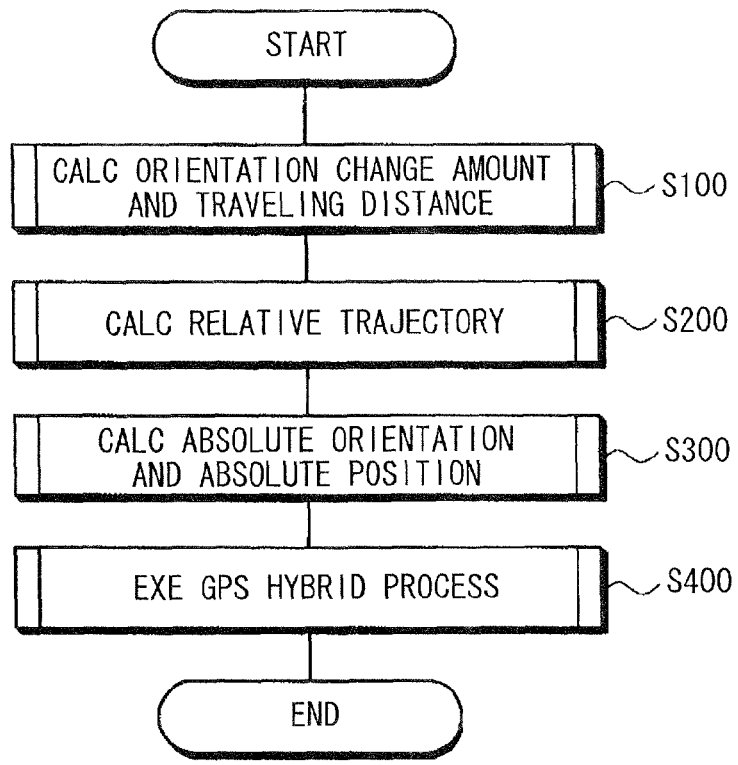
FIG. 4 is a flow chart showing an estimation navigation process in a controller.

FIG. 4 shows a flowchart of the estimation navigation method in the controller 10. When the current position detector turns on in an operation mode, the controller repeatedly executes the process in FIG. 4 with a predetermined period TM.

In the calculation process of the orientation change amount and the traveling distance in step S100, the orientation change amount is calculated based on the output angle of the gyroscope 22.

(ORIENTATION CHANGE AMOUNT)=(GYRO OUTPUT ANGULAR SPEED)×$TM$  F25

Figure 5:
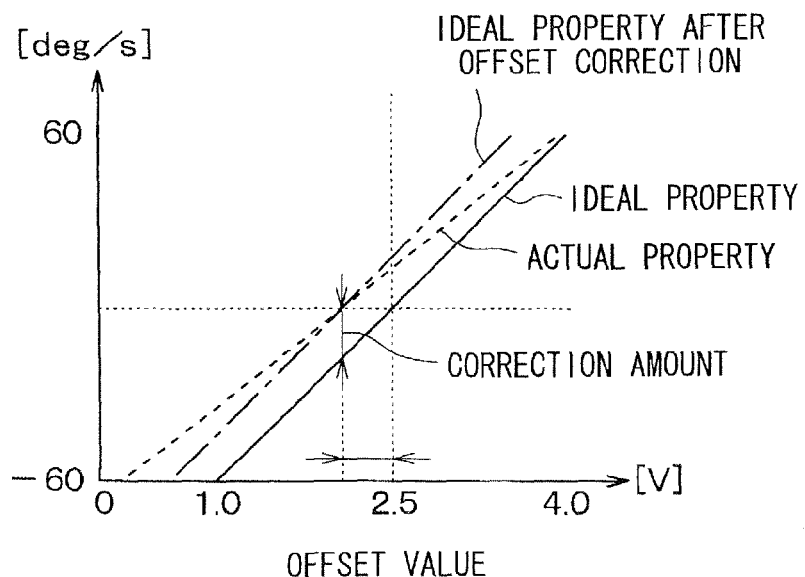
FIG. 5 is a graph showing an offset correction of a gyroscope.

Here, as shown in FIG. 5, the gyroscope output angular speed is calculated such that the offset value (e.g., 2.5 volts in FIG. 5) is subtracted from the sampling value of the output of the gyroscope 22, and then, the conversion gain is multiplied by the result of the subtraction.

Next, the offset correction of the orientation change amount is performed such that the predetermined period TM is multiplied by the later described offset correction amount, and then, the orientation change amount obtained in equation F25 is subtracted from the result of the multiplication.

(OFFSET-CORRECTED ORIENTATION CHANGE AMOUNT)=(ORIENTATION CHANGE AMOUNT)−(OFFSET CORRECTION$B$ AMOUNT)×$TM$  F26

Specifically, as shown in FIG. 5, the error based on the variation of the output voltage (i.e., the zero point) of the gyroscope 22 corresponding to the angular speed of zero (deg/sec) is corrected.

Next, the gain correction of the orientation change amount is performed such that the later described gain correction amount is subtracted from the offset-corrected orientation change amount.

(GAIN-CORRECTED ORIENTATION CHANGE AMOUNT)=(OFFSET-CORRECTED ORIENTATION CHANGE AMOUNT)−(GAIN CORRECTION AMOUNT)  F27

Figure 6:
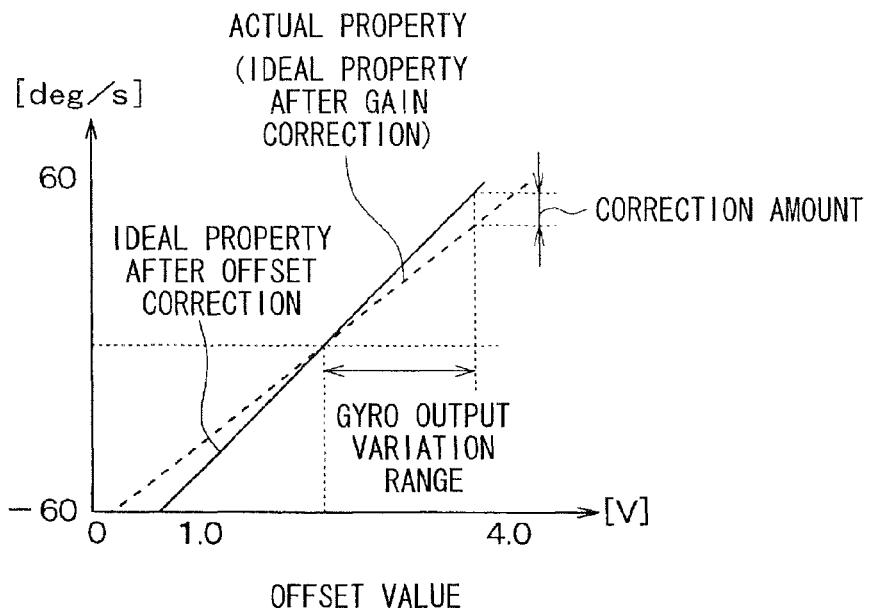
FIG. 6 is a graph showing a gain correction of the gyroscope.

Specifically, as shown in FIG. 6, the error based on the variation of the slope of the graph (i.e., the conversion gain) is corrected.

When the Kalman filter B is used, the equation F27 is modified as:

(GAIN-CORRECTED ORIENTATION CHANGE AMOUNT)=(OFFSET-CORRECTED ORIENTATION CHANGE AMOUNT)×{(ANGULAR GAIN CORRECTION AMOUNT)×(OFFSET-CORRECTED ORIENTATION CHANGE AMOUNT)+(ATTACHMENT ANGLE GAIN CORRECTION AMOUNT)}.

The traveling distance is calculated such that the later described distance factor is multiplied by the output pulse number, which is output from the vehicle speed sensor 21 and detected during the predetermined period TM.

(TRAVELING DISTANCE)=(SPEED SENSOR PULSE NUMBER)×(DISTANCE FACTOR)  F28

Thus, when the traveling distance is calculated, the calculation process for the orientation change amount and traveling distance ends.

In step S200, the relative trajectory is calculated. First, the gain-corrected orientation change amount calculated with using the equation F27 is added to the relative orientation, which is obtained previously, so that the relative orientation is updated.

(UPDATED RELATIVE ORIENTATION)=(RELATIVE ORIENTATION)+(GAIN-CORRECTED ORIENTATION CHANGE AMOUNT)  F29

Next, based on the updated relative orientation and the traveling distance calculated in the equation F28, the relative position coordinates are updated. Specifically, when the north-south direction is defined as the X axis, and the east-west direction is defined as the Y axis, the relative coordinate of the X axis is defined as rel-X, and the relative coordinate of the Y axis is defined as rel-Y. The relative coordinate of the X axis rel-X and the relative coordinate of the Y axis rel-Y are updated according to the equation F30. Here, θs represents the relative orientation calculated according to the equation F29.

rel-$X$=rel-$X$+(TRAVELING DISTANCE)×cos θ$s$ rel-$Y$=rel-$Y$+(TRAVELING DISTANCE)×sin θ$s$  F30

Specifically, the update of the relative coordinate of the X axis rel-X and the relative coordinate of the Y axis rel-Y is performed by adding the X component or the Y component of the relative orientation with respect to the traveling distance to the previous relation position coordinate. The relative position coordinate is calculated for obtaining the relative trajectory. According to the relationship between the relative trajectory and the road shape, the map matching process is performed.

Next, the traveling distance calculated with using the equation F28 is divided by the activation period TM in the main routine so that the vehicle speed is calculated.

(VEHICLE SPEED)=(TRAVELING DISTANCE)/$TM$  F31

Next, in step S300, the heading and the absolute position are calculated. First, the gain corrected orientation change amount calculated in the equation F27 is added to the heading, which is previously obtained, so that the heading is updated.

(UPDATED ABSOLUTE ORIENTAITON)=(HEADING)+(GAIN-CORRECTED ORIENTATION CHANGE AMOUNT)  F32

Next, based on the updated heading and the traveling distance calculated in the equation F28, the absolute position coordinates are updated. Specifically, when the north-south direction is defined as the X axis, and the east-west direction is defined as the Y axis, the absolute coordinate of the Y axis is defined as abs-X, and the absolute coordinate of the Y axis is defined as abs-Y. The absolute coordinate of the X axis abs-X and the absolute coordinate of the Y axis abs-Y are updated according to the equation F33. Here, θ represents the heading calculated according to the equation F32.

abs-$X$=abs-$X$+(TRAVELING DISTANCE)×cos θ abs-$Y$=abs-$Y$+(TRAVELING DISTANCE)×sin θ  F33

Specifically, the update of the absolute coordinate of the X axis abs-X and the absolute coordinate of the Y axis abs-Y is performed by adding the X component or the Y component of the heading with respect to the traveling distance to the previous absolute position coordinate. The updated heading and the updated absolute position are used for the later described GPS hybrid process.

Figure 7:
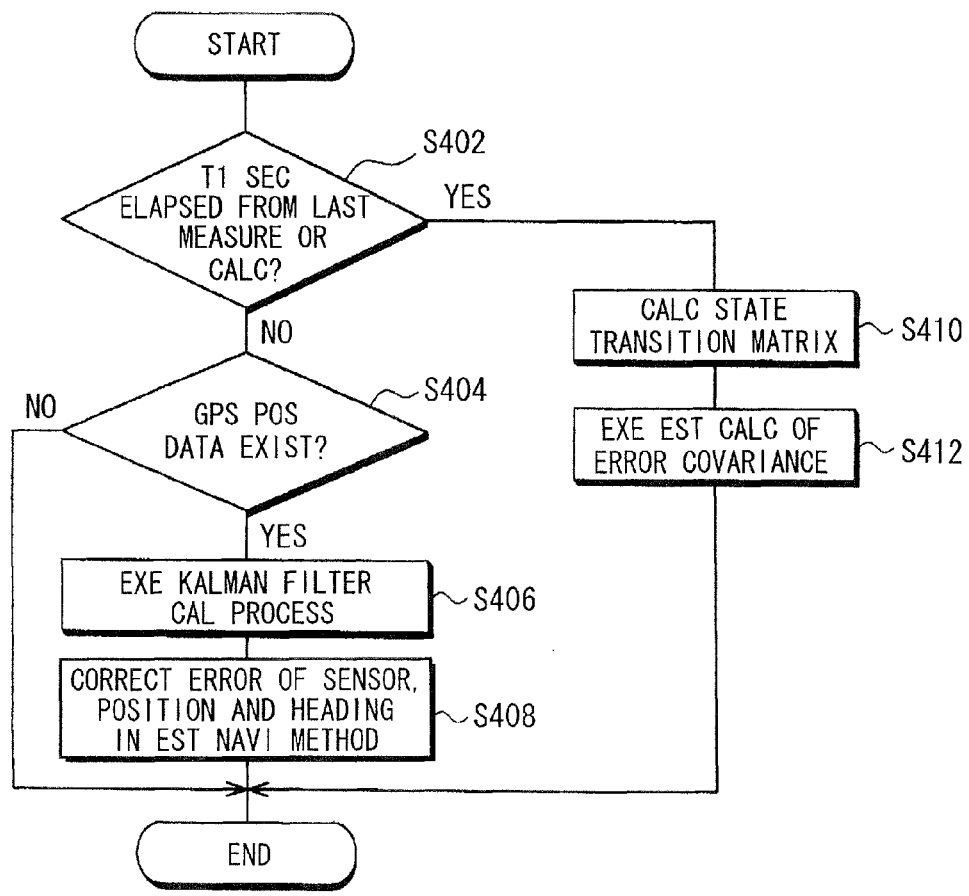
FIG. 7 is a flow chart showing a GPS hybrid process in the controller.

Next, in step S400, the GPS hybrid process is performed. The flowchart of the GPS hybrid process is shown in FIG. 7. In the GPS hybrid process, it is determined in step S402 whether T1 seconds has elapsed from the last position measurement or last estimation calculation. Here, when the T1 seconds has not elapsed from the last position measurement or last estimation calculation, i.e., the determination of step S402 is "NO," it goes to step S404. In step S404, it is determined whether the positioning data from the GPS receiver 10 exists.

When the positioning data from the GPS receiver 10 exists, i.e., when the determination of step S404 is "YES," it goes to step S406. In step S406, the calculation process for the Kalman filter is executed. In the present embodiment, the Kalman filter A and the Kalman filter B are switched so that the calculation process is executed for the Kalman filter A and the Kalman filter B, respectively. The switching process of the Kalman filter will be explained later. The switching process of the Kalman filter is executed according to a switching flag for the Kalman filter, which is set in the switching process.

Next, in step S408, the error of the estimation navigation method is corrected based on each error in the state vector x, which is obtained in the calculation process for the Kalman filter.

(OFFSET CORRECTION AMOUNT)=(OFFSET
    CORRECTION AMOUNT)+$\epsilon G$    F34

(GAIN CORRECTION AMOUNT)=(GAIN COR-
    RECTION AMOUNT)×(1−$\epsilon S$)    F35

(DISTANCE FACTOR)=(DISTANCE FACTOR)×(1−
    $\epsilon K$)    F36

(HEADING)=(HEADING)−$\epsilon \theta$    F37 abs-$Y$=abs-$Y$−$\epsilon Y$    F38 abs-$X$=abs-$X$−$\epsilon X$    F39

Here, when the Kalman filter B is used, the gain correction amount is divided into the angular speed gain correction amount and the attachment angle gain correction amount, so that the error of the estimation navigation method is corrected.

(ANGULAR SPEED GAIN CORRECTION
    AMOUNT)=(ANGULAR SPEED GAIN COR-
    RECTION AMOUNT)×(1−$\epsilon Sa$)    F35-1

(ATTACHMENT ANGLE GAIN CORRECTION
    AMOUNT)=(ATTACHMENT ANGLE GAIN
    CORRECTION AMOUNT)×(1−$\epsilon Sb$)    F35-2

With using the offset correction of the gyroscope 22 executed according to the equation F34, the offset correction amount to be used in the equation F26 is corrected. With using the gain correction executed according to the equation F35, the gain correction amount to be used in the equation F27 is corrected. With using the distance factor correction of the vehicle speed sensor 21 executed according to the equation F36, the distance factor to be used in the equation F27 is corrected. With using the heading correction executed according to the equation F37, the heading θ to be used in the equation F32 is corrected. With using the absolute position correction executed according to the equation F38, the absolute position to be used in the equation F33 is corrected.

Thus, the state equation for estimating the angular speed gain error of the orientation change amount and the attachment angle gain error with using the Kalman filter B is modeled with two variables $\epsilon Sa$, $\epsilon Sb$. Thus, each error is successively estimated based on the output value from the GPS receiver, so that the gain error is estimated with high accuracy.

When the positioning data of the GPS receiver 10 is not obtained for a long time such as equal to or longer than T1 seconds, the determination of step S402 is "YES." Then, it goes to steps S410, S412. In step S410, the state transition matrix A is calculated, and in step S412, the error covariance P is estimated and calculated. If no correction is executed in a case where the GPS positioning data is not obtained, the error would become large. Thus, even when the positioning data is not obtained, at least estimation of the error covariance P is performed, so that the Kalman filter process can be executed with high accuracy at a time when the GPS positioning data is obtained thereafter.

The above process is repeatedly executed in each case where the positioning data is obtained from the GPS receiver 10. Thus, the error is corrected, and the data by the estimation navigation method is obtained.

Figure 8:
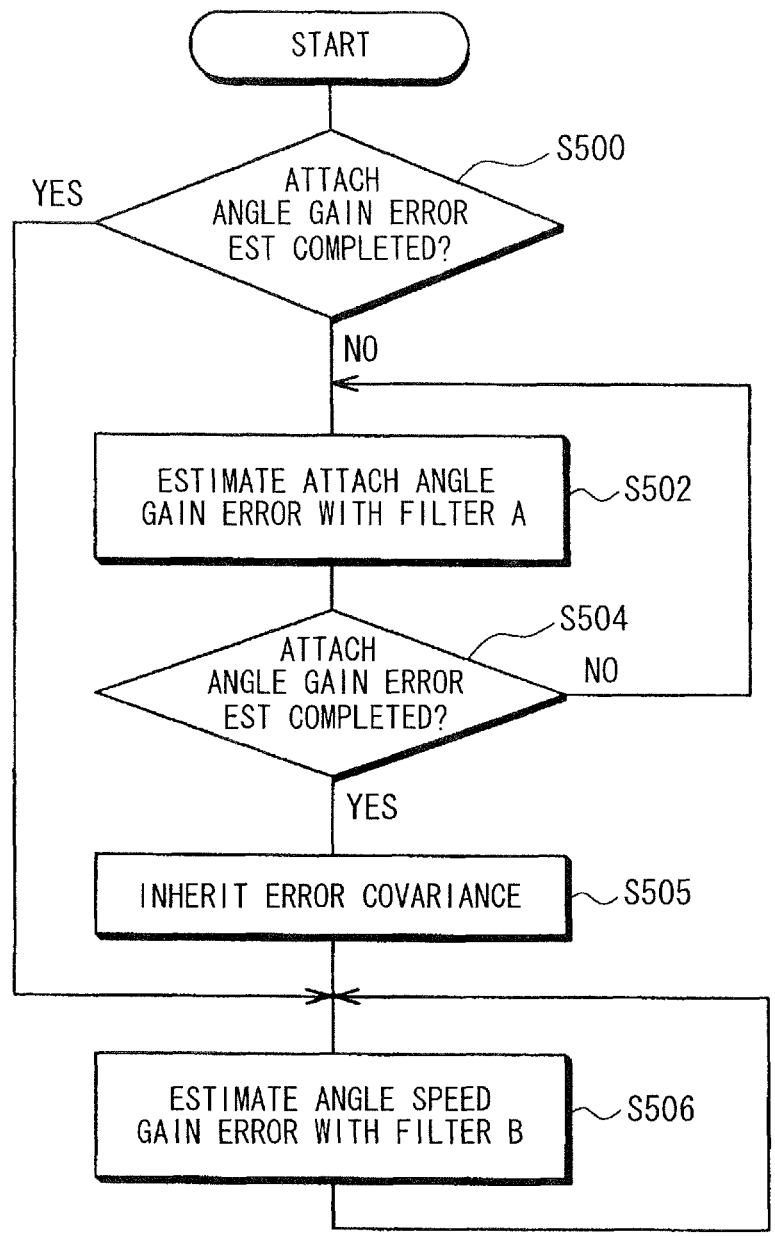
FIG. 8 is a flow chart showing a switching process between a Kalman filter VIIIA and a Kalman filter VIIIB in the controller.

FIG. 8 shows a flowchart of the process for switching between the Kalman filter A and the Kalman filter B. The controller 50 executes the switching process shown in FIG. 8 in parallel with the process by the estimation navigation method shown in FIG. 4.

First, in step S500, it is determined whether the attachment angle gain error estimation is already completed.

When the attachment angle gain error estimation is not completed yet, the determination of step S500 is "NO." In this case, it goes to step S502. In step S502, the Kalman filter switching flag is set so as to estimate the attachment angle gain error with using the Kalman filter A. Specifically, Kalman filter switching flag is set so that the calculation step with using the Kalman filter A is performed in step S406 shown in FIG. 7. Thus, in step S406 in FIG. 7, the calculation step with using the Kalman filter A is performed, so that the offset of the attachment angle gain error is estimated. In step S408, the attachment angle gain correction amount is corrected.

Next, in step S504, it is determined whether the attachment angle gain error estimation is already completed. The following equation F40 shows the error covariance matrix of the Kalman filter A.

$$P = \begin{bmatrix} & \sigma_{12} & & & & \\ \sigma_{21} & Ps & \sigma_{23} & \sigma_{24} & \sigma_{25} & \sigma_{26} \\ & \sigma_{32} & & & & \\ & \sigma_{42} & & & & \\ & \sigma_{52} & & & & \\ & \sigma_{62} & & & & \end{bmatrix} \quad F40$$

The diagonal component of the error covariance matrix of the Kalman filter A represents an estimation error amount of each variable. When the estimation error amount converses small, each variable is estimated accurately. For example, an element of the error covariance matrix of the Kalman filter A in the first row and the first column is a diagonal component corresponding to the offset error. The element of the error covariance matrix in the second row and the second column is a diagonal component corresponding to the attachment angle gain error. The element of the error covariance matrix in the third row and the third column is a diagonal component corresponding to the heading error. The element of the error covariance matrix in the fourth row and the fourth column is a diagonal component corresponding to the distance factor error. Here, it is determined, based on the information whether the diagonal component Ps in the error covariance matrix of the Kalman filter A corresponding to the attachment angle gain error is smaller than the threshold value Ths, whether the attachment angle gain error estimation is completed.

When the diagonal component Ps in the error covariance matrix of the Kalman filter A corresponding to the attachment angle gain error is not smaller than the threshold value Ths, the determination of step S504 is "NO." Then, it returns to step S502.

When the diagonal component Ps in the error covariance matrix of the Kalman filter A corresponding to the attachment angle gain error is smaller than the threshold value Ths, the determination of step S504 is "YES." Then, it goes to step S505. In step S505, the error covariance is inherited. In the present embodiment, six errors composed of the offset error of $\epsilon G$, the attachment angle gain error of $\epsilon S$, the heading error of $\epsilon \theta$, the distance factor error of $\epsilon K$, the absolute position north direction error of $\epsilon Y$, and the absolute position east direction error of $\epsilon X$ are estimated repeatedly with using the six by six matrix in the Kalman filter A. Then, with using each error estimated by the Kalman filter A, the estimation of the angular speed gain error is performed with using seven by seven matrix of the second Kalman filter. Thus, the angular speed gain error is rapidly estimated with high accuracy. Specifically, the error covariance is inherited so that the error covariance matrix P2 in the Kalman filter B is obtained based on the error covariance matrix P1 in the Kalman filter A. Here, $\sigma_{a\_ini}$ in the error covariance matrix P2 in the Kalman filter B shown in the equation F42 represents an initial value of the error covariance of the gyro gain (i.e., the angular speed error).

$$P_1 = \begin{bmatrix} \sigma_{11} & \sigma_{12} & \sigma_{13} & \sigma_{14} & \sigma_{16} & \sigma_{16} \\ \sigma_{21} & \sigma_{22} & \sigma_{23} & \sigma_{24} & \sigma_{25} & \sigma_{26} \\ \sigma_{31} & \sigma_{32} & \sigma_{33} & \sigma_{34} & \sigma_{35} & \sigma_{36} \\ \sigma_{41} & \sigma_{42} & \sigma_{43} & \sigma_{44} & \sigma_{45} & \sigma_{46} \\ \sigma_{51} & \sigma_{52} & \sigma_{53} & \sigma_{54} & \sigma_{55} & \sigma_{56} \\ \sigma_{61} & \sigma_{62} & \sigma_{63} & \sigma_{64} & \sigma_{65} & \sigma_{66} \end{bmatrix} \quad \text{F41}$$

$$P_1 = \begin{bmatrix} \sigma_{11} & 0 & \sigma_{12} & \sigma_{13} & \sigma_{14} & \sigma_{15} & \sigma_{16} \\ 0 & \sigma_{a\_ini} & 0 & 0 & 0 & 0 & 0 \\ \sigma_{21} & 0 & \sigma_{22} & \sigma_{23} & \sigma_{24} & \sigma_{25} & \sigma_{26} \\ \sigma_{31} & 0 & \sigma_{32} & \sigma_{33} & \sigma_{34} & \sigma_{35} & \sigma_{36} \\ \sigma_{41} & 0 & \sigma_{42} & \sigma_{43} & \sigma_{44} & \sigma_{45} & \sigma_{46} \\ \sigma_{51} & 0 & \sigma_{52} & \sigma_{53} & \sigma_{54} & \sigma_{55} & \sigma_{56} \\ \sigma_{61} & 0 & \sigma_{62} & \sigma_{63} & \sigma_{64} & \sigma_{65} & \sigma_{66} \end{bmatrix} \quad \text{F42}$$

As shown in the equation F42, the error covariance matrix P2 in the Kalman filter B includes the elements of the error covariance matrix P1 in the Kalman filter A shown in the equation F41, which are the elements all $\sigma11-\sigma16$, $\sigma21-\sigma26$, $\sigma31-\sigma36$, $\sigma41-\sigma46$, $\sigma51-\sigma56$, $\sigma61-\sigma66$. The element of the error covariance matrix P2 of the Kalman filter B in the second row and the second column represents the initial value $\sigma_{a\_ini}$ of the error covariance of the gyro gain (i.e., the angular speed error). The elements of the error covariance matrix P2 of the Kalman filter B in the second row and the first column, and the second row and the third column to the second row and the seventh column are zero. Further, the elements of the error covariance matrix P2 of the Kalman filter B in the first row and the second column, and the third row and the second column to the seventh row and the second column are zero.

When the attachment angle gain error is estimated with using the Kalman filter A, the angular speed gain error is estimated with using the Kalman filter B based on each estimation error of the output value of the angular speed sensor, the output value of the vehicle speed sensor and the output value of the GPS receiver estimated from the difference as the observation value between the output value of the GPS receiver and the relative trajectory or the traveling trajectory of the vehicle, and the error covariance calculated when the attachment angle gain error is estimated with using the Kalman filter A. Specifically, after each error such as the attachment angle gain error is estimated with using the Kalman filter A, the angular speed gain error is estimated with using the Kalman filter B according to each error such as the attachment angle gain error estimated with using the Kalman filter A and the error covariance estimated with using the Kalman filter A. Thus, the angular speed gain error can be rapidly estimated with high accuracy, compared with a case where the angular speed gain error is estimated again with using the Kalman filter B according to each error as an initial value other than the attachment angle gain error after each error such as the attachment angle gain error is estimated with using the Kalman filter A.

Next, in step S506, the Kalman filter switching flag is set so as to estimate the angular speed gain error with using the Kalman filter B. Specifically, the Kalman filter switching flag is set so as to execute the calculation step with using the Kalman filter B in step S406 in FIG. 7. Thus, in step S406 in FIG. 7, the calculation step is performed with using the Kalman filter B, so that the offset of the angular speed gain error is estimated. Thus, in step S408, the angular speed gain correction amount is corrected.

Figure 9A:
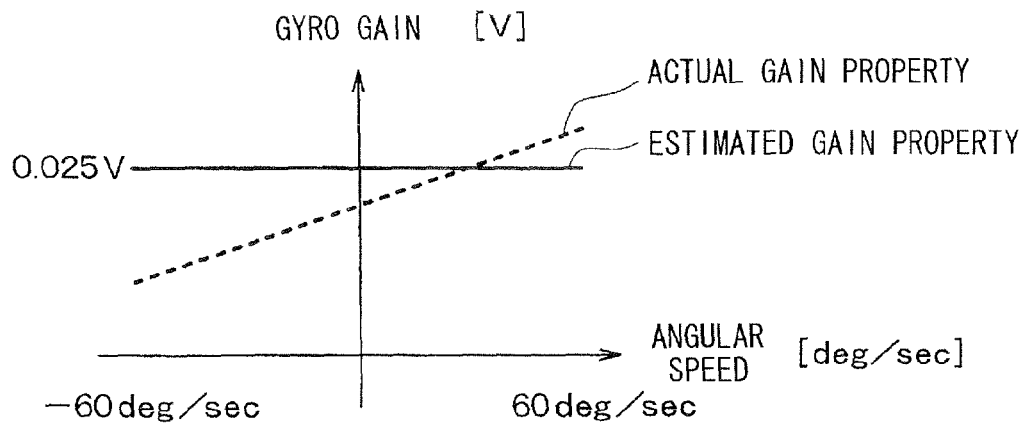
FIGS. 9A to 9C are diagrams showing estimation of an offset in the gain error with using the Kalman filter VIIIA.

The offset of the gain error shown in FIG. 9A is estimated with using the Kalman filter A. The offset of the gain error corresponds to the attachment angle gain error.

Figure 9B:
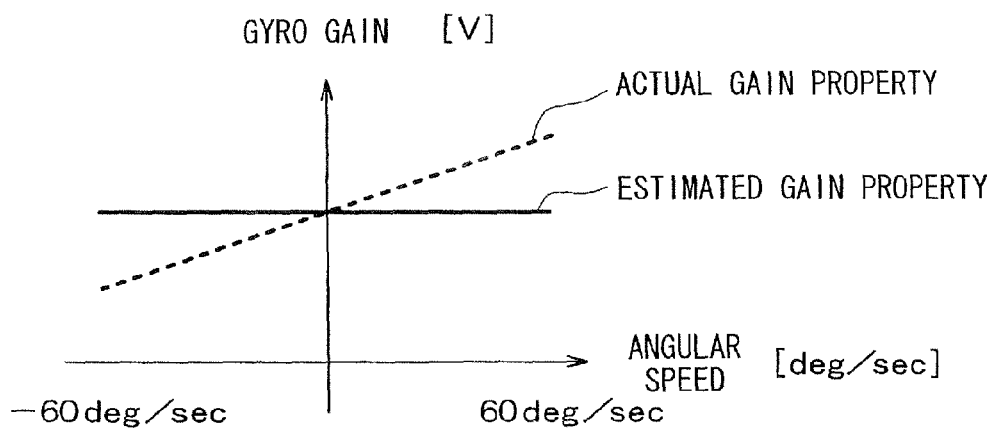
Figure 9C:
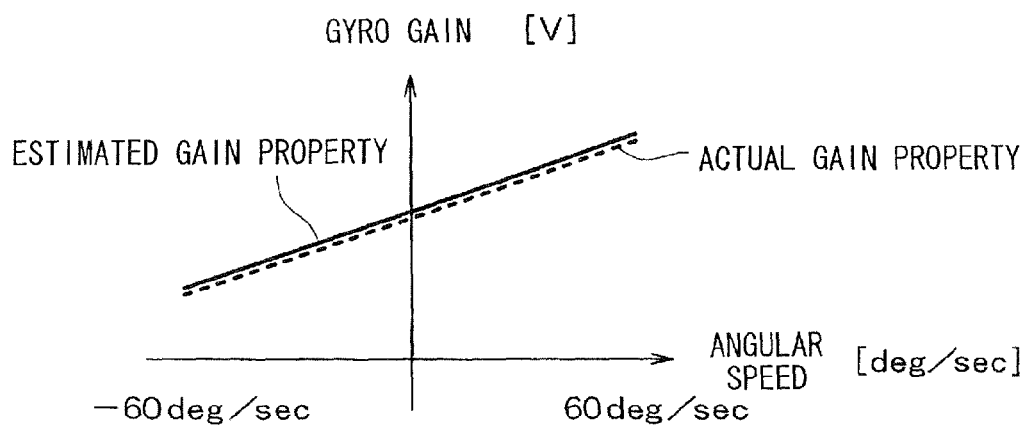

Next, the slope of the gain error shown in FIG. 9B is estimated with using the Kalman filter B. The slope of the gain error corresponds to the angular speed gain error. When the Kalman filter A is switched to the Kalman filter B, items relating to the angular speed gain error are initialized, and other items such as the correction amount estimated by the Kalman filter A and the diagonal components of the error covariance matrix are inherited to the Kalman filter B. Thus, the angular speed gain error is rapidly estimated with using the Kalman filter B with high accuracy.

Thus, the attachment angle gain error and the angular speed gain error are distinguishably estimated so that the gain error is accurately estimated. The actual gain property of the gyroscope is estimated with high accuracy.

In the above structure, the relative trajectory of the vehicle is estimated based on the orientation change amount calculated from the output value of the angular speed sensor and the traveling distance calculated from the output value of the speed sensor. Further, the traveling trajectory of the vehicle is estimated based on the relative trajectory of the vehicle and the output value of the GPS receiver. Each estimation error of the output value of the angular speed sensor, the output value of the vehicle speed sensor and the output value of the GPS receiver is estimated from the difference as the observation value between the output value of the GPS receiver and the relative trajectory or the traveling trajectory of the vehicle. Further, each error of the output value of the angular speed sensor, the output value of the vehicle speed sensor and the output value of the GPS receiver is corrected based on each estimated error. The gain error of the output value of the angular speed sensor is estimated such that the attachment angle gain error attributed to the attachment angle of the angular speed sensor to the vehicle body and the angular speed gain error attributed to the non-linear gain property with respect to the angular speed of the angular speed sensor are distinguished. Thus, even when the gyroscope having the non-linear output voltage property with respect to the angular speed is used, the traveling trajectory of the vehicle is accurately estimated.

The first correction amount for correcting the error attributed to the attachment angle of the angular speed sensor to the vehicle body is calculated from the attachment angle gain error. Further, the second correction amount for correcting the error attributed to the non-linear gain property of the angular speed sensor is calculated from the angular speed gain error. With using the first and second correction amounts, the heading error for correcting the heading amount calculated from the output value of the GPS receiver is estimated.

Here, when the orientation change amount is defined as D, and the angular speed gain error is defined as $\epsilon Sa,t-1$, the orientation error caused by the angular speed gain error is determined as $D2 \times \epsilon Sa,t-1$ so as to be modeled, and the second correction amount is estimated. When the orientation change amount is defined as D, and the attachment angle gain error is defined as $\epsilon Sb,t-1$, the orientation error caused by the attachment angle gain error is determined as $D \times \epsilon Sb,t-1$ so as to be modeled, and the first correction amount is estimated.

Further, the attachment angle gain error is estimated with using the first function, and the angular speed gain error is estimated with using the second function, which is different from the first function.

After the attachment angle gain error is estimated and the first correction amount is calculated with using the first Kalman filter capable of estimating the attachment angle gain error and calculating the first correction amount, it is determined whether the diagonal component corresponding to the attachment angle gain error in the error covariance matrix in the first Kalman filter is smaller than a predetermined threshold value. After the diagonal component corresponding to the attachment angle gain error in the error covariance matrix in the first Kalman filter is smaller than the predetermined threshold value, the angular speed gain error is estimated and the second correction amount is calculated with using the second Kalman filter capable of estimating the angular speed gain error and calculating the second correction amount. Specifically, after the attachment angle gain error is estimated and the first correction amount is calculated with using the first Kalman filter, i.e., after the diagonal component of the error covariance matrix in the first Kalman filter corresponding to the attachment angle gain error is converged so that the attachment angle gain error is accurately estimated, the estimation of the angular speed gain error and the calculation of the second correction amount with using the second Kalman filter are performed. Thus, the attachment angle gain error and the angular speed gain error are estimated with high accuracy, and the first and second correction amounts are calculated with high accuracy.

In the above embodiment, the heading error is estimated in such a manner that the angular speed gain error provided by the quadratic function having the orientation change amount D as a variable and the attachment angle gain error provided by a linear function having the orientation change amount D as a variable affect the heading error. It is not necessary to provide the angular speed gain error with the quadratic function having the orientation change amount D as a variable. Alternatively, for example, the heading error may be estimated in such a manner that the angular speed gain error provided by the cubic function having the orientation change amount D as a variable affects the heading error.

The gyroscope corresponds to the angular speed sensor, and the vehicle speed sensor corresponds to the speed sensor. Steps S100 to S300 in FIG. 4 correspond to a traveling trajectory estimating element, step S400 in FIG. 4 and steps S402 to S412 in FIG. 7 and steps S500 to S506 in FIG. 8 correspond to an error estimating element, step S502 corresponds to the attachment angle gain error estimating element, step S504 corresponds to the determination element, and step S506 corresponds to the angular speed gain error estimating element.

The above disclosure has the following aspects.

According to an aspect of the present disclosure, a current position detector for a vehicle includes: an angular speed sensor for outputting an angular speed signal corresponding to a rotation angular speed of the vehicle; a speed sensor of outputting a speed signal corresponding to a traveling speed of the vehicle; a GPS receiver for receiving an electric wave from a GPS satellite and for outputting a GPS signal, which provides to specify an absolute position and an heading of the vehicle; a traveling trajectory estimating element for estimating a relative trajectory of the vehicle based on an orientation change amount and a traveling distance, and for estimating a traveling trajectory of the vehicle based on the relative trajectory of the vehicle and the GPS signal, wherein the orientation change amount is calculated from the angular speed signal, and the traveling distance is calculated from the speed signal; and an error estimating element for estimating each error of the angular speed signal, the speed signal and the GPS signal with using a difference between the relative trajectory, the traveling trajectory and the GPS signal as an observation value, and for correcting each error of the angular speed signal, the speed signal and the GPS signal based on estimated corresponding error. The error estimating element estimates a gain error of the angular speed signal in such a manner that an attachment angle gain error attributed to an attachment angle of the angular speed sensor to the vehicle and an angular speed gain error attributed to a non-linear gain property of the angular speed sensor with respect to the angular speed are independently estimated.

In the above detector, since the attachment angle gain error and the angular speed gain error are independently estimated, the device can estimates the traveling trajectory of the vehicle with high accuracy even when an output voltage property of the angular speed sensor with respect to the angular speed is non-linear.

Alternatively, the error estimating element may calculate a first correction amount according to the attachment angle gain error and a second correction amount according to the angular speed gain error. The error estimating element corrects an error of the attachment angle of the angular speed sensor with using the first correction amount. The error estimating element corrects an error of the non-linear gain property of the angular speed sensor. The error estimating element may estimate an heading error according to the first correction amount and the second correction amount. The error estimating element corrects an heading amount with using the heading error. The heading amount is calculated based on the GPS signal. In this case, the device can correct the heading amount with high accuracy, the heading amount being calculated from the GPS signal of the GPS receiver.

Further, the orientation change amount is defined as D, and the angular speed gain error previously estimated is defined as $\epsilon Sa_{t-1}$. The error estimating element may calculate the second correction amount in such a manner that an orientation error attributed to the angular speed gain error is modeled as $D^2 \epsilon Sa_{t-1}$.

Further, the orientation change amount is defined as D, and the attachment angle gain error previously estimated is defined as $\epsilon Sb_{t-1}$. The error estimating element may calculate the first correction amount in such a manner that an orientation error attributed to the attachment angle gain error is modeled as $D \epsilon Sb_{t-1}$.

Alternatively, the error estimating element may estimate the attachment angle gain error with using a first function, and the error estimating element may estimate the angular speed gain error with using a second function, which is different from the first function.

Alternatively, the error estimating element may include an attachment angle gain error estimating element, a determining element, and an angular speed gain error estimating element. The attachment angle gain error estimating element estimates the attachment angle gain error and calculates the first correction amount with using a first Kalman filter, which provides to executes estimation of the attachment angle gain error and calculation of the first correction amount. The determining element determines whether a diagonal component of an error covariance matrix in the first Kalman filter is smaller than a predetermined threshold value after the attachment angle gain error estimating element estimates the attachment angle gain error and calculates the first correction amount. The diagonal component corresponds to the attachment angle gain error. The angular speed gain error estimating element estimates the angular speed gain error and calculates the second correction amount with using a second Kalman filter after the determining element determines that the diagonal component is smaller than the predetermined threshold value. The second Kalman filter provides to executes estimation of the angular speed gain error and calculation of the second correction amount. In this case, the attachment angle gain error and the angular speed gain error are estimated with high accuracy, and the first and second correction amounts are calculated with high accuracy.

Further, the angular speed gain error estimating element may estimate the angular speed gain error with using the second Kalman filter according to each estimated error of the angular speed signal, the speed signal and the GPS signal and an error covariance value when the attachment angle gain error estimating element estimates the attachment angle gain error and calculates the first correction amount with using the first Kalman filter. The error covariance value is calculated when the error estimating element calculates the first correction amount. In this case, the angular speed gain error is rapidly estimated with high accuracy, compared with a case where the angular speed gain error is estimated with using the second Kalman filter when errors other than the attachment angle gain error are set to be initial values after each error such as the attachment angle gain error is estimated with using the first Kalman filter.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A current position detector for a vehicle comprising:
an angular speed sensor for outputting an angular speed signal corresponding to a rotation angular speed of the vehicle;
a speed sensor of outputting a speed signal corresponding to a traveling speed of the vehicle;
a GPS receiver for receiving an electric wave from a GPS satellite and for outputting a GPS signal, which provides to specify an absolute position and an heading of the vehicle;
a traveling trajectory estimating element for estimating a relative trajectory of the vehicle based on an orientation change amount and a traveling distance, and for estimating a traveling trajectory of the vehicle based on the relative trajectory of the vehicle and the GPS signal, wherein the orientation change amount is calculated from the angular speed signal, and the traveling distance is calculated from the speed signal; and
an error estimating element for estimating each error of the angular speed signal, the speed signal and the GPS signal with using a difference between the relative trajectory, the traveling trajectory and the GPS signal as an observation value, and for correcting each error of the angular speed signal, the speed signal and the GPS signal based on estimated corresponding error,
wherein the error estimating element estimates a gain error of the angular speed signal in such a manner that an attachment angle gain error attributed to an attachment angle of the angular speed sensor to the vehicle and an angular speed gain error attributed to a non-linear gain property of the angular speed sensor with respect to the angular speed are independently estimated.

2. The current position detector according to claim 1, wherein the error estimating element calculates a first correction amount according to the attachment angle gain error and a second correction amount according to the angular speed gain error,
wherein the error estimating element corrects an error of the attachment angle of the angular speed sensor with using the first correction amount,
wherein the error estimating element corrects an error of the non-linear gain property of the angular speed sensor,
wherein the error estimating element estimates an heading error according to the first correction amount and the second correction amount,
where the error estimating element corrects an heading amount with using the heading error, and
wherein the heading amount is calculated based on the GPS signal.

3. The current position detector according to claim 2, wherein the orientation change amount is defined as D, and the angular speed gain error previously estimated is defined as $\epsilon Sa_{t-1}$, and
wherein the error estimating element calculates the second correction amount in such a manner that an orientation error attributed to the angular speed gain error is modeled as $D^2 \epsilon Sa_{t-1}$.

4. The current position detector according to claim 2, wherein the orientation change amount is defined as D, and the attachment angle gain error previously estimated is defined as $\epsilon Sb_{t-1}$, and
wherein the error estimating element calculates the first correction amount in such a manner that an orientation error attributed to the attachment angle gain error is modeled as $D \epsilon Sb_{t-1}$.

5. The current position detector according to claim 1,
wherein the error estimating element estimates the attachment angle gain error with using a first function, and
wherein the error estimating element estimates the angular speed gain error with using a second function, which is different from the first function.

6. The current position detector according to claim 1,
wherein the error estimating element includes an attachment angle gain error estimating element, a determining element, and an angular speed gain error estimating element,
wherein the attachment angle gain error estimating element estimates the attachment angle gain error and calculates the first correction amount with using a first Kalman filter, which provides to executes estimation of the attachment angle gain error and calculation of the first correction amount,
wherein the determining element determines whether a diagonal component of an error covariance matrix in the first Kalman filter is smaller than a predetermined threshold value after the attachment angle gain error estimating element estimates the attachment angle gain error and calculates the first correction amount,
wherein the diagonal component corresponds to the attachment angle gain error,
wherein the angular speed gain error estimating element estimates the angular speed gain error and calculates the second correction amount with using a second Kalman filter after the determining element determines that the diagonal component is smaller than the predetermined threshold value, and
wherein the second Kalman filter provides to executes estimation of the angular speed gain error and calculation of the second correction amount.

7. The current position detector according to claim 6,
wherein the angular speed gain error estimating element estimates the angular speed gain error with using the second Kalman filter according to each estimated error of the angular speed signal, the speed signal and the GPS signal and an error covariance value when the attachment angle gain error estimating element estimates the attachment angle gain error and calculates the first correction amount with using the first Kalman filter, and
wherein the error covariance value is calculated when the error estimating element calculates the first correction amount.

* * * * *